J. G. SIMS.
COTTON CHOPPING MACHINE.
APPLICATION FILED MAR. 11, 1919.

1,336,708.

Patented Apr. 13, 1920.

INVENTOR.
James G. Sims
BY
J. O. Ledbetter
ATTORNEY.

UNITED STATES PATENT OFFICE.

JAMES G. SIMS, OF BOWIE, TEXAS, ASSIGNOR OF ONE-FOURTH TO WYATT S. RIGGINS, OF BOWIE, TEXAS.

COTTON-CHOPPING MACHINE.

1,336,708.   Specification of Letters Patent.   Patented Apr. 13, 1920.

Application filed March 11, 1919. Serial No. 281,999.

*To all whom it may concern:*

Be it known that I, JAMES G. SIMS, a citizen of the United States, residing at Bowie, in the county of Montague and State of Texas, have invented certain new and useful Improvements in Cotton-Chopping Machines, of which the following is a specification.

This invention relates to new and usefully improved cotton chopping machines.

A purpose of the invention is to provide a form of machine which in fact will be an attachment capable of attaching to or mounting upon the conventional type of wheeled cultivator so universally used on the farm. It is desired to furnish a cotton chopper attachment for cultivators so the farmer who already owns a cultivator may procure a chopper attachment at small cost and use same in connection with his standard farm tool. It is therefore one of the purposes as above stated to design a simplified form of chopping machine which may be applied to the variety of existing cultivators, and one of such simplicity as to enable the farmer himself to do the work of setting up his chopper or installing it on his cultivator.

Another purpose of the invention is to provide adequate adjustments of the parts of the chopper so as to render it adaptable to cultivators and other similar wheeled farm implements. And still further objects reside in the provision of features for regulating the cutting depth and cutting breadth of the chopper blade which chops and hoes the cotton. Simplicity and sturdiness of construction are further subjects of the present invention.

With the above and further objects in view the invention has relation to a certain combination and arrangement of parts, an example of which is described in the following specification, pointed out in the appended claims and illustrated in the accompanying drawings, wherein:

Figure 1:
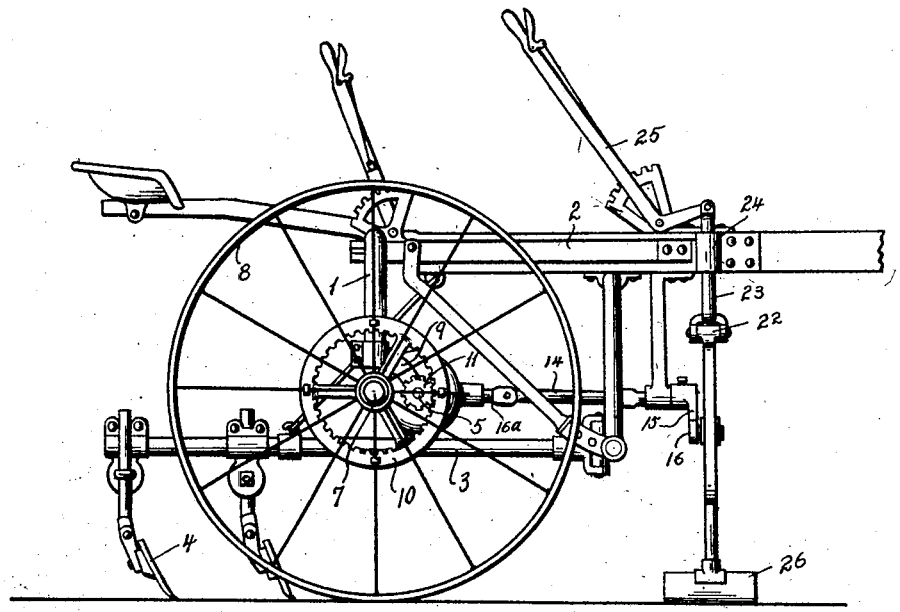
Figure 1 illustrates in side elevation, the chopper machine shown in connection with a conventional type farm cultivator.
Figure 3:
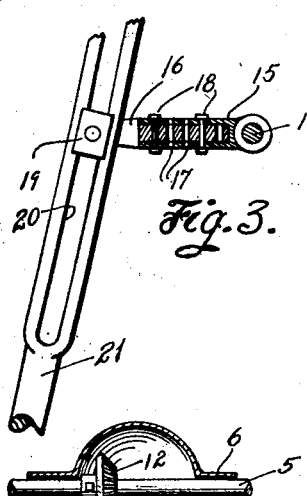
Fig. 3 is a detail view of a certain part of the chopper element employed in the machine.
Figure 4:
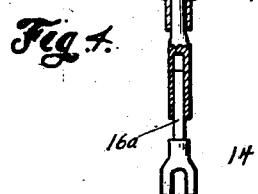
Fig. 4 is a detail view of a driving element and shaft extension employed in the transmission of the chopper.
Figure 2:
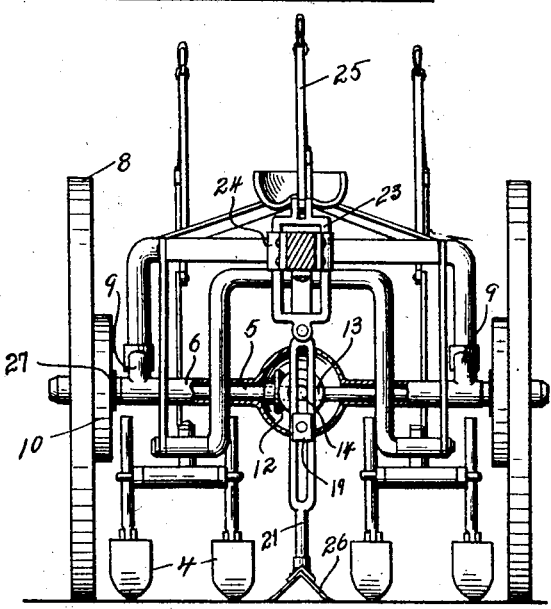
Fig. 2 shows the full assembly in front elevation.

Referring now more in particular to the drawings, wherein the same parts throughout the several views are designated by identical references by numerals or otherwise, the numerals 1, and 2, point out the frame of the cultivator upon which the chopper is shown attached, while the plow beams and plows are respectively designated by 3, and 4. In this instance the frame 1 is shown as the main yoke in the cultivator and is made to receive the main transverse drive shaft 5 which will preferably be carried within a housing 6 which is in turn carried and supported by the lower ends of the yoke frame. The yoke member 1 of the cultivator terminates with journals 7 which receive the wheels 8. Brackets 9, which are a part of the chopper attachment proper, are bolted or otherwise securely attached to the yoke and reach out therefrom connecting rigidly with the housing 6 and hold said housing in a rigidly spaced relation with other members of the machine, and in alinement transversely with said machine and in properly engaging relation with the main driving gears 10 attached to the cultivator wheels. The drive shaft and correlated elements form an assembled unit which may be installed upon the cultivator as described, namely through the agency of the support brackets 9. These brackets may be manufactured in several different styles of design so as to render the chopper attachment as universally adaptable to as many different makes of cultivators as practical. These brackets support the axle housing unit as a whole and render the attachment convenient in its installation upon the farmer's cultivator or other tools, or implements.

One drive shaft 5 may be employed and fitted upon each end with drive pinions 11 engaged with the drive gears 10. This double drive arrangement insures a unilinear pull or draft and eliminates side strain and motions due to single drive, or to drive from one ground wheel only. A bevel gear 12 is fixed upon the drive shaft and engages with a bevel gear 13 carried upon a shaft 14 which extends longitudinally of the machine and has fitted upon the forward end thereof a crank 15. This shaft is provided with a slip-joint 16ª which permits said shaft to be adjusted in length. This feature further adapts the chopper attachment to different types of cultivators in that the chopper shaft 14 may be adjusted to fit the installation requirements met when the chopper is applied to various forms of cultivators.

The crank 15 is fitted with a telescoping head 16 provided with holes 17 through which bolts 18 may be passed to secure the two members 15 and 16 together. The crank can therefore be extended in length by adjusting the head inwardly or outwardly, and this feature will permit of adjustment in length of the chopping stroke of the machine. The crank head carries a cross-head 19 fitting within a guideway 20 of a chopping arm 21. This chopping arm or hoe arm 21 is pivotally suspended from a hanger bracket 23 which is constructed in the form of a yoke and straddles the tongue of the machine. This hanger-bracket is slidably confined in a guide 24 which is itself secured to the tongue or frame of the machine. A hand lever 25 establishes an adjustable relation with the hanger bracket and thus provides means for raising or lowering the chopping arm. This lever will be mounted upon the cultivator just ahead of the operator and within his convenient reach. A hoe blade 26 is attached to the lower end of the chopping arm, and may be removed therefrom for renewal or sharpening.

The chopping depth of the hoe is regulated by the hand lever and can be so adjusted as to obtain any depth desired. This permits the chopper to be effectively operated in irregular ground surface. The stroke of the hoe can also be regulated through the means previously described by letting out on the crank head. These two adjustments taken together enables the machine to be put through the most efficient operating performance, and will thus meet rigid requirements as to a cotton chopping machine.

The driving wheels will preferably be provided with some capable form of clutch mechanism, such as 27, which will permit the machine to be backed up or partly turned around without reversing the chopping mechanism.

A crop of cotton chopped with this machine where the hoe is followed immediately by the plows 4 to hill up the plants after chopping will be found to be hardier in growth and more perfect in stand than is ordinarily obtained by hand chopping or hoeing.

The invention is presented to include all such changes and modifications in design and form as may come within the scope of the following claims.

Claims:

1. A cotton chopping machine comprising a farm cultivator provided with ground wheels, gears fitted to the wheels, a driving mechanism comprising an axle housing containing a drive shaft and gears, a pair of support brackets adapted to support the driving mechanism in engagement with the driving gears, a shaft fitted with a gear and meshing with the driving mechanism, a slip joint contained within the last mentioned shaft for adjusting the length thereof, a hoeing arm operated by the last mentioned shaft, and means for adjusting the depth of the hoe arm.

2. A chopping machine of the character described, the combination with driving means, a shaft fitted with means for adjusting the length thereof, a crank fixed upon said shaft, means for varying the length of the crank, a hanger bracket arranged to undergo vertical adjustment, a chopping arm pivotally carried upon the hanger bracket and having connection with the crank, and means for adjusting up and down the hanger bracket to vary the chopping depth of the operation of the chopping arm.

In testimony whereof I affix my signature.

JAMES G. SIMS.